United States Patent [19]
Thielmann

[11] Patent Number: 5,129,546
[45] Date of Patent: Jul. 14, 1992

[54] STORAGE CONTAINER FOR BUTTON-SHAPED BATTERIES

[75] Inventor: Walter R. Thielmann, Dusseldorf, Fed. Rep. of Germany

[73] Assignee: Eveready Battery Company, Inc., St. Louis, Mo.

[21] Appl. No.: 544,688

[22] Filed: Jun. 27, 1990

[51] Int. Cl.$^5$ .............................................. B65G 59/00
[52] U.S. Cl. ...................................... 221/66; 221/98; 221/102; 221/281; 221/198; 221/310; 206/333
[58] Field of Search .......... 221/66, 97, 185, 312 R-C, 221/281, 287, 197, 307, 309, 310, 198, 98, 102; 206/333, 528, 538-539; 312/42, 45, 49, 72

[56] References Cited

U.S. PATENT DOCUMENTS

| | | | |
|---|---|---|---|
| 2,081,656 | 5/1937 | Anthony | 206/333 |
| 2,625,192 | 1/1953 | Kinskie | 206/333 |
| 2,766,763 | 10/1956 | Slough | 221/281 |
| 3,206,067 | 9/1965 | Smith et al. | 221/309 |
| 3,433,351 | 3/1969 | Zaborney | 206/333 |
| 3,501,016 | 3/1970 | Eaton | 221/66 |
| 3,625,396 | 12/1971 | Phipps | 206/333 |
| 3,809,287 | 5/1974 | Muller-Scherak | 221/66 |
| 4,062,445 | 12/1977 | Möe | 206/538 |
| 4,114,780 | 9/1978 | Sharon | 221/185 |
| 4,592,377 | 6/1986 | Paulsen et al. | 221/66 |
| 4,848,568 | 7/1989 | Eckelman | 206/333 |

*Primary Examiner*—H. Grant Skaggs
*Attorney, Agent, or Firm*—Robert W. Welsh

[57] ABSTRACT

Storage container for button-shaped batteries with a minimum of one channel, which is dimensioned to fit the cross section of the battery and which has an entrance and an exit opening, a slide, which is located inside the channel and which is secured against being pushed out of the channel by means of limit stops at the entrance and exit openings, and locks which permit the passage of the button-shaped batteries only in the direction of the exit opening. The storage container serves to store new and used button-shaped batteries, with the latter being able to be inserted only into the entrance opening, while, at the same time a new button-shaped battery is dispensed at the exit opening. After all new batteries have been used up and the storage container is filled with used button-shaped batteries, the passage is blocked so that no further button-shaped batteries can be inserted.

5 Claims, 3 Drawing Sheets

STORAGE CONTAINER FOR BUTTON-SHAPED BATTERIES

The subject matter of this invention concerns a storage container for button-shaped batteries, especially for hearing-aid batteries.

Presently, a considerable number of button-shaped cells of different sizes, chemical systems, and capacities are commercially available. For example, silver oxide cells are used exclusively in wrist watches, alkali manganese batteries for pocket calculators and pocket electronic games. In cameras, mercury and silver oxide batteries of different sizes are used. The new generation of hearing aids uses four different sizes of mercury batteries. Hearing-aid batteries are produced especially for this purpose since they have a high current consumption.

If a pocket calculator stops operating or if a watch stops because the battery is dead, the associated problems are generally of minor importance. People who are dependent on hearing aids, however, are considerably handicapped if their hearing aid stops working because the battery has gone bad. It is therefore especially useful for users of hearing aids to carry at least one replacement battery with them at all times. Furthermore, since button-shaped batteries, especially hearing-aid batteries, contain mercury, used batteries cannot be discarded in the household garbage but must be returned to the vendor. It is, however, easy to lose individual used button-shaped batteries, which, for no other reason than that, poses a risk to the environment.

It is therefore the object of this invention to create a storage container for button-shaped batteries which provides a simple storage means for several batteries and which, at the same time, is suitable to hold used batteries, with the result that, after the removal of the new batteries and the insertion of the corresponding number of used button-shaped batteries, it is easily possible to return the container to the vendor or to a special collection site.

This problem is solved according to this invention by means of a storage container with a minimum of one channel, which is dimensioned to fit the cross section of the button-shaped batteries and which has an entrance and an exit opening, and locks which permit the passage of the button-shaped batteries only in the direction of the exit opening. Furthermore, the storage container may be equipped with a slide which is located inside the channel and which is secured against being pushed out of the channel by means of limit stops attached at the entrance and exit openings.

The channel may hold several new button-shaped batteries, for example, six, which are dispensed individually by inserting a used button-shaped battery into the entrance opening. Through this insertion of a used button-shaped battery, the new batteries, and potentially also the slide, are pushed a distance, which corresponds to the diameter of the battery, [toward the exit opening] so that a new button-shaped battery is dispensed at the exit opening of the channel. The lock at the entrance opening of the channel keeps the batteries from being pushed back and also prevents an erroneous insertion of a used button-shaped battery into the exit opening of the channel. Once the last new button-shaped battery has been removed from the channel and the channel is filled up to the entrance opening with used batteries, the slide is in contact with an appropriate limit stop in the vicinity of the exit opening of the channel and prevents the further insertion of used button-shaped batteries into the channel.

The user is therefore ensured that it is impossible to make a mistake when removing new and inserting used button-shaped batteries, and he/she knows immediately when all new batteries have been used and the storage container is filled with used button-shaped batteries.

The storage container may have a straight or a U-shaped channel for holding the batteries, and the holding capacity for new and used button-shaped batteries may be increased by providing a minimum of two channels in a parallel arrangement to each other.

Preferably, the slide may be fitted with projections which engage with corresponding guides in the channel, and the guides may be terminated at the entrance and exit openings by the limit stops, thereby ensuring that the slide can move only between the limit stop at the entrance opening and the limit stop at the exit opening.

Preferably, the locks consist of flexible tongues which project into the channel and which, if the storage container consists of a synthetic material, may be molded in one piece from the same synthetic material.

If the flexible tongues project obliquely toward the inside of the channel and if at least the tongues at the entrance opening of the channel are arranged along the lateral walls of the channel and point to the center of the last inserted button-shaped battery, the batteries can be pushed easily and without great exertion of force into the channel so that the last new button-shaped battery is pushed out of the exit opening of the channel via the corresponding flexible tongues, while the insertion of a button-shaped battery into the exit opening is safely prevented since the tongues pointing to the center of the last inserted battery are unable to yield and thus form a secure lock.

Since, in correspondence with the size of the button-shaped batteries, the storage container according to this invention may be very small, it is recommended to fit a battery-dispensing case for at least one storage container with one slide lock each for the entrance opening and the exit opening of each storage container. Such a battery-dispensing case can be labeled and is more easily stored than the small storage containers. It is especially recommended to fit the battery-dispensing case on one of its large surfaces with a flap for inserting a storage container with a U-shaped channel and with a slide lock which at the same time opens or closes the entrance opening and the exit opening of the channel. In this manner, the battery-dispensing case can be easily opened with one hand. The opening for inserting used button-shaped batteries and the exit opening for new batteries can be easily labeled, and the storage container can be easily removed from or inserted like a cassette into the battery-dispensing case.

As a result of two circular slits in the storage container, it is furthermore possible to test the batteries individually without having to remove them from the package.

This invention will be described in greater detail on the basis of several practical examples which are illustrated in the attached drawing.

Figure 1:
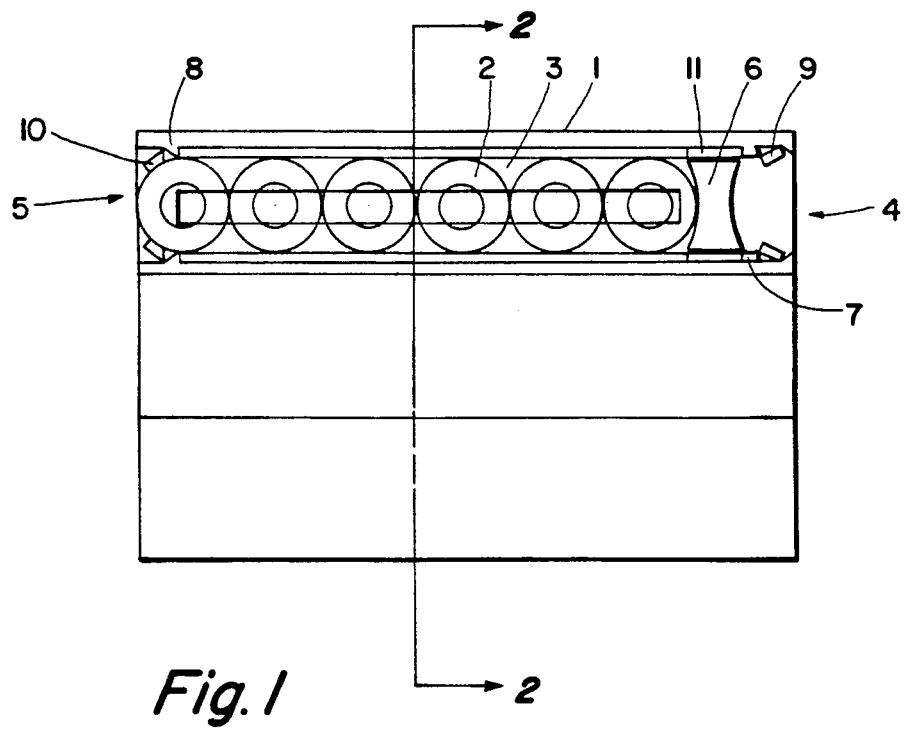
FIG. 1 shows a section through a storage container with a straight channel along line I—I in FIG. 2.

Storage container 1 for six button-shaped batteries 2 has a rectangular channel 3 whose cross-section is dimensioned to fit the shape of button-shaped batteries 2.

Button-shaped batteries 2 are inserted into entrance opening 4 and are dispensed from exit opening 5. Channel 3 contains a slide 6 which separates new button-shaped batteries 2 from used button-shaped batteries. The movement of slide 6 is terminated by limit stop 7 at entrance opening 4 and by limit stop 8 at exit opening 5 of channel 3. Slide 6 has lateral projections 11 which slide in corresponding guides 12 of channel 3. These guides 12 are terminated by limit stops 7 and 8. At entrance opening 4, locks in the shape of flexible tongues 9, and at exit opening 5, locks in the shape of flexible tongues 10 are provided.

Flexible tongues 9 project at an angle of approximately 45° into channel 3, but can be pushed aside by inserting a used button-shaped battery 2 so that a battery can be inserted into channel 3. At the same time, new button-shaped batteries 2 and slide 6 move a corresponding distance into the direction of exit opening 5 so that the last button-shaped battery 2, which is adjacent to exit opening 5, is pushed past the yielding flexible tongues 10 and exits from storage container 1.

Flexible tongues 10, which project at an angle of 45° into channel 3, form a secure lock against the possibility that a used button-shaped battery might be inserted into exit opening 5 and might push the new button-shaped batteries 2 and slide 6 back, since the tongues point to the center of a used button-shaped battery 2 inserted at the entrance opening and are therefore unable to yield even to maximum pressure.

Several straight channels 3 may be arranged parallel to each other within one storage container 1, which considerably increases the holding capacity of the storage container.

Figure 2:
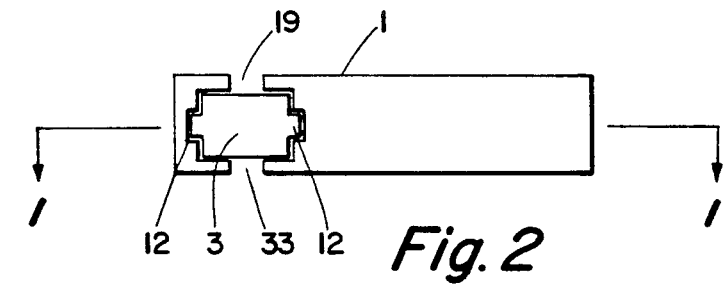
FIG. 2 shows a section along line II—II in FIG. 1.
Figure 3:
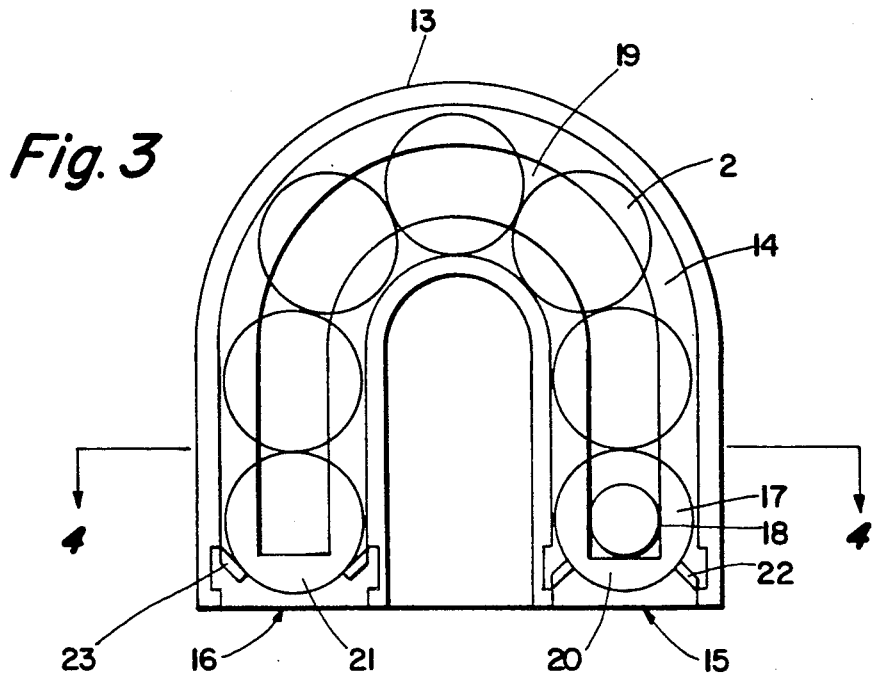
FIG. 3 shows a top view of a storage container with a U-shaped channel.
Figure 4:
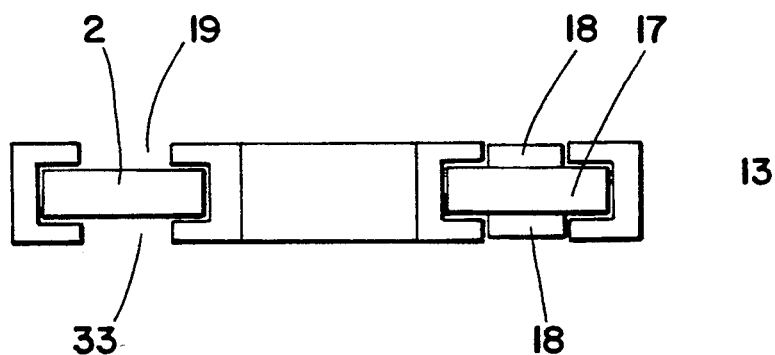
FIG. 4 shows a section along line IV—IV in FIG. 3.

Storage container 13, which is illustrated in FIG. 3, differs from storage container 1 according to FIGS. 1 and 2 in that channel 14 is curved in the shape of a U, so that entrance opening 15 and exit opening 16 adjoin in one plane.

Slide 17 has the form of a button-shaped battery 2 but has an axial projection 18 with smaller diameter, which slides in guide 19 which is located above channel 14. The portions of guide 19 adjacent to entrance opening 15 and exit opening 16 are terminated by limit stops 20 and 21, which ensures that slide 17 cannot slip out of channel 14. Flexible tongues 22 at entrance opening 15 and flexible tongues 23 at exit opening 16 of channel 14 act in the same way as the tongue described in the context of FIGS. 1 and 2.

Figure 5:
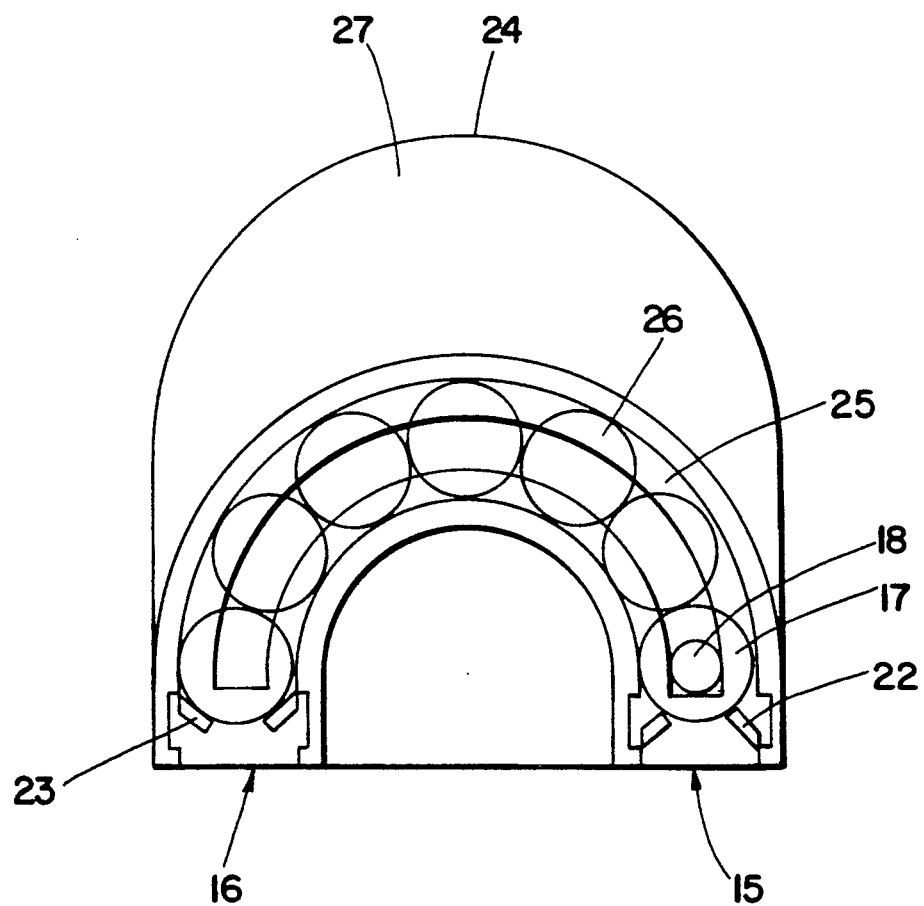
FIG. 5 is a top view of a storage container for smaller button-shaped batteries.

In storage container 24 according to FIG. 5, the same number of button-shaped batteries 26 may be housed in a semi-circularly curved channel 25 since the diameter of button-shaped batteries 26 is smaller than that of the example in FIGS. 1 to 4. Otherwise, the storage container shown in FIG. 5 has the same construction; however, it contains a filling piece so that it has the same size as the storage container according to FIG. 3.

Figure 6:
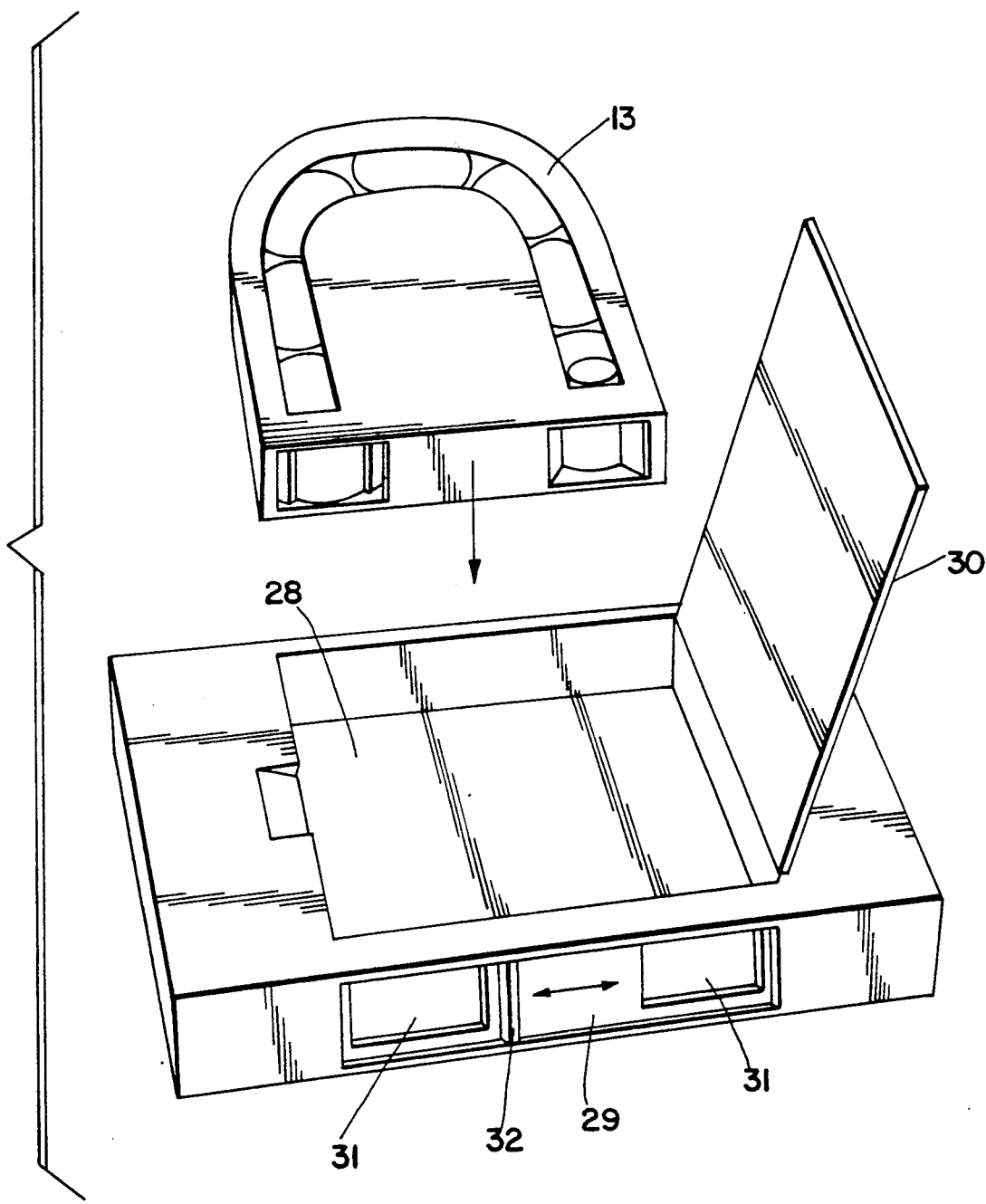
FIG. 6 shows a perspective view of a battery-dispensing case for storage batteries a with U-shaped channel.

As a result of this, storage containers 13 as illustrated in FIG. 3 and storage container 24 as illustrated in FIG. 5 may be inserted into battery-dispensing case 28 which is shown in FIG. 6. For this purpose, the wide surface of case 28 is fitted with flap 30. Storage container 13 or 24 can therefore be inserted into battery-dispensing case 28 as one would insert a cassette into a cassette holder. In battery-dispensing case 28, entrance opening 15 and exit opening 16 of storage container 13 are arranged so that they lie opposite to corresponding windows 31 in a slide lock 29. By means of a handle 32, it is possible to move lock 29 in such a way that entrance opening 15 and exit opening 16 are closed and the button-shaped batteries are completely protected within battery-dispensing case 28.

To ensure that the charge of the batteries can be checked, the storage container is fitted with slit 33 which is located opposite to guide 19, thus, both poles are accessible via guide 19 and slit 33.

I claim:

1. A storage container for button-shaped batteries having a minimum of one channel dimensioned to fit the cross-section of the button-shaped batteries, which channel has an entrance opening and an exit opening, and a slide located in and confined to the channel by at least one stop at each end of said channel, and flexible tabs at the entrance opening and the exit opening of said channel, said tabs being arranged along the side walls and pointing toward the inside of the channel permitting passage of a battery only in the direction of the exit opening.

2. The container of claim 1, wherein the channel is straight.

3. The container of claim 1, wherein the channel is U-shaped.

4. A battery dispensing case comprising a battery storage container of claim 3 said case being of a substantially rectangular box-like configuration and having an openable flap on one surface for allowing passage of the U-shaped battery storage container into and out of said dispensing case;
- a first opening on one side of said rectangular box aligned with the exit opening of the storage container and a second opening on the same side of said rectangular box aligned with the entrance opening of the battery storage container; and
- a slidable door on said rectangular box for simultaneously opening or closing said first and second openings.

5. The container of claim 1, further comprising a slit in the vicinity of one of the poles for the batteries stored in the container.

* * * * *